3,780,118
PREPARATION OF DIHYDROCARBON BERYLLIUM COMPOUNDS

David R. Carley, 2824 Cedarcrest Ave. 70816; Byron R. Lowrance, Rte. 2, Box 229 70815; and Jesse Roger Mangham, 2035 Glendale Ave. 70808, all of Baton Rouge, La.
No Drawing. Filed Dec. 17, 1962, Ser. No. 246,867
Int. Cl. C07f 3/00
U.S. Cl. 260—665 R                                6 Claims

ABSTRACT OF THE DISCLOSURE

This invention relates to an improved process for the preparation of organoberyllium compounds and more particularly to improvements in the method of preparing organoberyllium compounds with the use of Grignard reagents.

---

The preparation of dialkyl beryllium by the Grignard route is typically subject to difficulties in isolating the desired reaction product and to consequent wide variations in yield and quality of product. When the usual bromide and iodide Grignard compounds are employed in diethyl ether, the by-product magnesium salts are relatively soluble in the ether and only a small proportion, at most, of the salt can be filtered off. The dialkyl beryllium etherate therefore is obtained still admixed with a large volume of magnesium halide solids. Isolation of the dialkyl beryllium ethereate by ether co-distillation using the method of Gilman and Schulze (J. Chem. Soc., 1927, 2663) is long and tedious. A 25 percent over-all yield of diethyl beryllium etherate is considered typical.

When an attempt is made to avoid the above difficulties of separation by preparing beryllium alkyl from alkyl magnesium chloride and beryllium chloride, the by-product magnesium chloride is indeed insoluble in the reaction solvent but, as found by Coates and Glockling (J. Chem. Soc., 1954, 2526–9), the use of beryllium chloride is accompanied by gelation which prevents filtration. If the product can be isolated at all, it must be distilled from a semi-solid mass. This, of course, greatly increases the difficulty of isolating the desired product.

It is accordingly an object of the present invention to provide a novel, simplified and improved process for the preparation of organoberyllium compounds. Another object is to provide a novel process for the preparation of organoberyllium compounds in high yield and purity. Still another object is to provide an improved process for the preparation of organoberyllium compounds which avoids the above-described shortcomings of the prior art. Still other objects will appear hereinafter.

These and other objects of the invention are accomplished by the provision of a novel and improved process for the preparation of organoberyllium compounds by the Grignard route. More specifically, this invention provides an improvement in the method of preparing diorganoberyllium compounds from organo magnesium chloride and beryllium chloride which comprises introducing the beryllium chloride into the organo magnesium chloride solution at a sufficiently high rate to prevent the formation of a gel, separating the insoluble magnesium chloride and recovering the diorganoberyllium compound from the reaction solution.

Normally, the beryllium chloride addition to the organo magnesium chloride takes 30–90 minutes owing to vigorous diethyl ether reflux caused by strong heat evolution during reaction. However, by providing a large capacity condenser for reflux or by external cooling of the reaction vessel, or both, addition times of six minutes or less can be attained. By exercising unusual care, addition times as low as 10–30 seconds can be reached. The best results are obtained under the conditions providing the most rapid combination of reagents.

The beryllium chloride-Grignard reaction of this invention can also be carried out in a continuous manner. Thus, when ether solutions of alkyl magnesium chloride and beryllium chloride are metered into a reaction zone at relative rates such that in a given interval of time the amounts of the reactants entering the reaction zone are essentially chemically equivalent, no gel formation occurs. This process thus avoids the requirement of rapid addition of the beryllium chloride, but requires a relatively precise adjustment of the rates of introduction of the reactants into the reaction zone, neither reactant being present in excess, at any time, by an amount greatly exceeding 5 mole percent. Accordingly, this constitutes an embodiment of the present invention.

The process of this invention affords a number of advantages over the Grignard processes previously reported. For example, this process provides organoberyllium compounds in high yield and purity which compounds are therefore more suitable for use as chemical intermediates than were the products of previous processes. Furthermore, this process is characterized by rapidity and simplicity of operation. Its use avoids gel formation with attendant manipulative difficulties, losses and impurities, and avoids the need for high temperatures with their attendant decomposition of the product.

The organic radicals of the diorganoberyllium compounds prepared by the process of this invention may be alkyl, aryl, cycloalkyl, alkaryl or aralkyl radicals. Generally, these will each contain up to about 18 carbon atoms, although this is not critical. Of these, the alkyl derivatives, particularly the lower alkyl derivatives ($C_1$–$C_6$), are preferred because of their ready accessibility, ease of preparation and purification, and relatively low cost.

The invention will be more fully understood by reference to the following illustrative examples in which all parts and percentages are by weight.

EXAMPLE I

A solution of beryllium chloride (made from 5.4 grams—0.60 mole—of beryllium chips and the stoichiometric amount of hydrogen chloride) in 250 ml. of reagent anhydrous diethyl ether was added in a period of about 90 seconds to a vigorously stirred solution of ethyl magnesium chloride (made from 81.9 grams—1.27 moles—of ethyl chloride and 33.9 grams—1.39 gram atoms of magnesium metal) in 600 ml. of diethyl ether. The reactants were initially at room temperature. Vigorous reflux occurred during the addition. Toward the end of the addition period, the reaction mixture underwent partial gelation, but agitation of the flask and continued stirring caused the mixture to become fluid once more. The stirring was continued for 3 hours in order to increase the crystals size.

The mixture was filtered and the cake was washed with two 100-ml. portions of fresh diethyl ether. Dry nitrogen was drawn through the cake to assist in stripping the product liquid. The solvent was stripped from the product by distillation, first at atmospheric and then at reduced pressure. A yield of 27.0 grams of diethyl beryllium, equivalent to 67.3 percent of theory, was obtained.

When the above experiment was repeated, using a packed column for the final distillation, an 82.0 percent yield of diethyl beryllium was obtained.

When the above procedure was repeated using methyl magnesium chloride in place of ethyl magnesium chloride, similar results were obtained, and dimethyl beryllium was obtained in 87 percent yield.

EXAMPLE II 111.8 grams (0.49 mole) of beryllium chloride bis-diethyl etherate were dissolved by gentle warming in 250 ml. of anhydrous diethyl ether. The solution was transferred to a 500-ml. dropping funnel and was added rapidly to a solution of 0.99 mole of isopropyl magnesium chloride in 350 ml. of anhydrous diethyl ether. The addition was complete in 6 minutes. An immediate reaction occurred with solids formation and refluxing. Toward the end of the addition period the mixture appeared to be gelling, but during the 10-minute stirring period which followed, the mixture became more fluid and stirred well. The reaction mixture was then transferred to a coarse fritted glass filter through which the liquid passed rapidly and easily. The residue was washed well with ether and with pentane. The reaction mixture, which was light brown in color, was evacuated to remove the ether. After the bulk of the ether had been removed, the residual ether was separated by heating to 60° C. under high vacuum for about 4 hours, and the residue was left standing under vacuum overnight. The diisopropyl beryllium product weighed 35.4 grams, corresponding to a yield of 75.9 percent.

The following comparative example shows the deleterious effects of slow addition of beryllium chloride.

COMPARATIVE EXAMPLE

A flask was charged with 0.29 mole of isopropyl magnesium chloride in 100 ml. of anhydrous diethyl ether. A dropping funnel attached to the flask was charged with a solution of 5.24 grams of beryllium chloride in 200 ml. of dry ether. The beryllium chloride solution was added slowly with stirring over a period of 1½ hours. The mixture was heated to reflux. By the time half the beryllium chloride solution had been added a permanent white precipitate was present. As the beryllium chloride addition continued, the reaction mixture set up into a solid gel, which underwent no change in appearance as addition was completed. Attempts to recover the beryllium alkyl from the gel were completely unsuccessful.

EXAMPLE III

A solution of beryllium chloride (from 5.4 grams— 0.60 gram atom of beryllium chips) in 280 ml. of sodium-dried diethyl ether was added in a period of 40 seconds to a vigorously stirred solution of tert-butyl magnesium chloride (from 36.5 grams—1.50 gram atoms of magnesium metal, and 164 ml.—1.50 moles—of tert-butyl chloride) in 850 ml. of ether. During the beryllium chloride addition period vigorous ether refluxing occurred. Stirring and gentle heating to reflux were continued for 2 hours longer. The reaction mixture then separated on standing into a bottom layer of grainy solids and a brownish ether layer. Filtration was accomplished by sucking the stirred mixture through a coarse fritted filter into a 2-liter flask. The solids on the filter were washed with two 125-ml. portions of ether. A small amount of dry argon was drawn through the filter cake at the end to strip it of liquid.

The ether from the above filtrate was removed by distillation at atmospheric pressure. The di-tert-butyl beryllium etherate was then fractionated through a 1½" column packed with ¼" Intalok saddles. It boiled at 55° C. at 1.0 mm. pressure. The distillation yield was 84.6 grams (71.5 percent based on beryllium chloride) of di-tert-butyl beryllium etherate.

When the tert-butyl magnesium chloride of the above example is replaced by n-amyl-, 2-ethylhexyl-, n-octadecyl-, phenyl-, o-tolyl-, 3,4-xylyl-, mesityl-, pseudocumyl-, cyclopentadienyl-, methylcyclopentadienyl-, methyl-n-dodecylcyclopentadienyl-, indenyl-, fluorenyl-, cyclohexyl-, cumenyl-, carracryl-, p-n-dodecylphenyl-, phenethyl-benzyl-, 3-phenylpropyl or 12-phenyl-n-dodecyl magnesium chloride, similar results are obtained.

The beryllium chloride dietherate employed in the process of the invention was prepared by the reaction of hydrogen chloride with beryllium metal in diethyl ether solution. This preparation is shown in detail in the following example.

EXAMPLE IV

Preparation of beryllium chloride dietherate. 5.4 grams (0.60 mole) of beryllium chips were charged to a Soxhlet extractor on top of a glass wool filter plug. A 250-ml. portion of reagent anhydrous diethyl ether was charged to the pot below the Soxhlet extractor and hydrogen chloride was bubbled in through a wash bottle containing concentrated sulfuric acid. The beryllium chips dissolved in about 2½ hours. The solution was stripped of hydrogen chloride and excess ether by gradually lowering the pressure while heating and stirring with a magnetic heater-stirrer. The temperature was maintained at 45–50° C. Since beryllium chloride dietherate melts at 43° C. Toward the end of the stripping operation, with the pressure at 1 mm., the product started to solidify. 100 ml. of ether was quickly added. The product liquified and remained liquid on cooling. The product was used without further separation in the dialkyl beryllium synthesis.

In carrying out the process of this invention the reactants are normally combined as indicated above in approximately stoichiometric proportions, but the proportions employed can vary in batch type operations from stoichiometric to a 100 percent or greater excess by weight of the Grignard reagent. A moderate excess of the Grignard reagent, say about 10 to 20 percent by weight, is often used to bring about an increased reaction rate.

The reaction can be carried out at any temperature within the liquid range of the solvent. However, since it is exothermic, the reaction is normally begun at room temperature or below. Once the reaction is underway, the heat of reaction causes refluxing of the solvent and this refluxing in turn serves to control the reaction temperature.

The reaction can be carried out under a range of pressures varying from less than $\frac{1}{10}$ atmosphere to more than 10 atmospheres. However, it proceeds smoothly at atmospheric pressure and since reaction under this pressure results in simplicity of operation and equipment, this pressure is preferred.

The most important operating condition for the reaction of this invention is the rate of addition of the beryllium chloride solution. In general, this addition should be made with great rapidity, being completed in 2 minutes or less in the case of diethyl beryllium synthesis. In the case of certain other compounds, slightly longer addition periods of 6 minutes or more have been used successfully. As indicated above, however, much longer addition periods, say of the order of an hour or more, result in gelation of the reaction mixture which in turn makes recovery of the reaction product extremely difficult and tedious. It is unnecessary, but helpful, to agitate the reactants as they are rapidly combined in accordance with the process of the invention in order to achieve rapid reaction and to obtain a product of maximum purity.

The reaction of this invention may be carried out using any of a variety of aliphatic ethers as solvent. Suitable solvents include dimethyl, methyl ethyl, diethyl, diisopropyl, di-n-butyl, and diisoamyl ethers and their mixtures. Of these, diethyl ether is preferred because of its availability and economy.

The organoberyllium compounds prepared by the process of this invention have known uses in the chemical and allied arts. For example, they can be used as catalyst ingredients for the polymerization of ethylene and other monomers, a typical reference to this utility being U.S. Pat. 2,917,501 granted Dec. 15, 1959.

Having thus described the novel process for synthesis of organoberyllium compounds, it is not intended to be limited except as set forth in the following claims.

What is claimed is:

1. In a process for the preparation of a dihydrocarbon beryllium compound which comprises reacting an ether solution of a hydrocarbon magnesium chloride with an ether solution of beryllium chloride, the improvement which comprises introducing the beryllium chloride solution into the hydrocarbon magnesium chloride solution at a sufficiently high rate to prevent the formation of a gel and recovering the hydrocarbon beryllium compound from the reaction solution.

2. The process of claim 1 wherein the hydrocarbon beryllium compound is a dialkyl beryllium.

3. The process of claim 1 wherein the hydrocarbon beryllium compound is diethyl beryllium.

4. The process of claim 1 wherein the hydrocarbon beryllium compound is diisopropyl beryllium.

5. The process of claim 1 wherein the hydrocarbon beryllium compound is di-tert-butyl beryllium.

6. The process of claim 1 wherein the hydrocarbon beryllium compound is diethyl beryllium and wherein the introduction of the beryllium chloride into the organo magnesium chloride solution consumes a period of not in excess of 2 minutes.

References Cited

Coates et al., J. Chem. Soc. (London), pp. 22 to 27 (1954).

LELAND A. SEBASTIAN, Primary Examiner

PO-1050 (5/69)

UNITED STATES PATENT OFFICE
CERTIFICATE OF CORRECTION

Patent No. 3,780,118               Dated December 18, 1973

Inventor(s) David R. Carley, Byron R. Lowrance and Jesse R. Mangham

It is certified that error appears in the above-identified patent and that said Letters Patent are hereby corrected as shown below:

In the heading to the printed specification, at the end of line 7, insert -- , assignors to Ethyl Corporation, New York, N.Y. --  Column 3, line 73, "phenethyl-" should read -- phenethyl-, --.  Column 4, line 19, "Since" should read -- since --.

Signed and sealed this 12th day of November 1974.

(SEAL)
Attest:

McCOY M. GIBSON JR.
Attesting Officer

C. MARSHALL DANN
Commissioner of Patents